United States Patent [19]
Beffa et al.

[11] Patent Number: 4,652,631
[45] Date of Patent: Mar. 24, 1987

[54] BIS 1:2 CHROMIUM COMPLEXES OF DISAZO AND AZO OR AZOMETHINE DYES

[75] Inventors: Fabio Beffa, Riehen, Switzerland; Ulrich Schlesinger, Binzen, Fed. Rep. of Germany

[73] Assignee: Ciba-Geigy Corporation, Ardsley, N.Y.

[21] Appl. No.: 717,734

[22] Filed: Mar. 28, 1985

[30] Foreign Application Priority Data

Apr. 5, 1984 [CH] Switzerland ............... 1719/84

[51] Int. Cl.$^4$ .................. C09B 45/06; C09B 45/26; D06P 1/10
[52] U.S. Cl. ..................... 534/645; 534/582; 534/695; 534/697; 534/699; 534/700; 534/738; 556/34
[58] Field of Search ............... 534/645, 695, 699, 738, 534/697; 556/34

[56] References Cited

U.S. PATENT DOCUMENTS 2,295,050  9/1942  Reynolds et al. ........... 534/645
4,256,633  3/1981  Beffa .................. 534/645 X
4,311,641  1/1982  Beffa .................. 534/645 X
4,502,860  3/1985  Back .................. 534/699 X

FOREIGN PATENT DOCUMENTS 1020137  11/1957  Fed. Rep. of Germany ...... 534/645
560824   4/1957  Italy ..................... 534/645
380268   9/1964  Switzerland .............. 534/645

Primary Examiner—Floyd D. Higel
Attorney, Agent, or Firm—Edward McC. Roberts; Meredith C. Findlay

[57] ABSTRACT

1:2 chromium complex dyes suitable for dyeing nitrogen-containing materials and materials which contain hydroxyl groups, are disclosed which, in the form of the free acid, have the formula

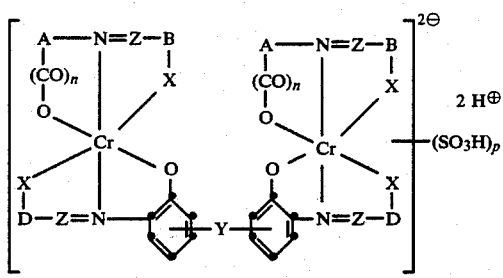

wherein each of the symbols independently has the following meanings:

Z is nitrogen or a —CH,

A is a benzene or naphthalene radical which carries the hydroxyl or carboxy ortho to the azo or azomethine group, or, if n is 1 and Z is a —CH, is the radical of an aliphatic, cycloaliphatic or aromatic aminocarboxylic acid, B and D are each independently of the other the radical of a coupling component which couples in the alpha- or o-position relative to X if Z is nitrogen, or the radical of an o-hydroxyaldehyde if Z is —CH, X is oxygen or —NR, wherein R is hydrogen or $C_1$-$C_4$alkyl, with the proviso that X must be oxygen if Z is —CH, Y is a bridge member of the formula —$SO_2$ or —$SO_2$—NR—$SO_2$—, wherein R is hydrogen or $C_1$-$C_4$alkyl, n is 0 or 1, and p is an integer from 0 to 6.

11 Claims, No Drawings

BIS 1:2 CHROMIUM COMPLEXES OF DISAZO AND AZO OR AZOMETHINE DYES

The present invention relates to chromium complex dyes which, in the form of the free acid, have the formula

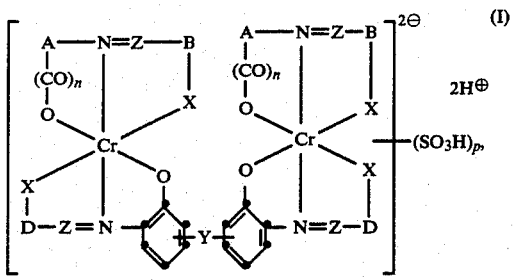

wherein each of the symbols independently has the following meanings:

Z is nitrogen or a —CH group,

A is a radical of the benzene or naphthalene series which carries the hydroxyl or carboxyl group ortho to the azo or azomethine group, or, if n is 1 and Z is a —CH group, is the radical of an aliphatic, cycloaliphatic or aromatic aminocarboxylic acid, B and D are each independently of the other the radical of a coupling component which couples in the α- or o-position relative to X if the adjacent substituent Z is nitrogen, or the radical of an o-hydroxyaldehyde if the adjacent substituent Z is the —CH group, X is oxygen or a group of the formula —NR, wherein R is hydrogen or $C_1$–$C_4$alkyl, with the proviso that X must be oxygen if the adjacent substituent Z is the —CH group, Y is a bridge member of the formula —$SO_2$ or —$SO_2$—NR—$SO_2$—, wherein R is hydrogen or $C_1$–$C_4$alkyl, n is 0 or 1, and p is an integer from 0 to 6.

The dyes of the formula I contain from 0 to 6 sulfo groups. These groups are present in the radicals A, B or D.

Preferred compounds of the formula I are those which contain from 0 to 2 sulfo groups.

The preferred value of n is 0, i.e. each of the the components A carries a hydroxyl group ortho to the azo or azomethine group.

In the chromium complexes of the above formula I, the radicals A can additionally carry one or more further substituents, for example low molecular alkyl or alkoxy, halogen such as chlorine or bromine, nitro, cyano, sulfo, carboxy, phosphono, alkylsulfonyl, for example methylsulfonyl, sulfamido groups such as sulfamido or N-methylsulfamido, arylazo, preferably phenylazo, wherein the phenyl moiety may be further substituted for example by sulfo, or acylamino. Low molecular alkyl or alkoxy groups will be generally understood as meaning throughout this specification those groups which contain 1 to 6, preferably 1 to 2, carbon atoms; and acylamino denotes low molecular alkanoylamino, alkylsulfonylamino and alkoxycarbonylamino radicals as well as aroylamino and arylsulfonylamino radicals.

The radicals A are derived for example from the following amines: anthranilic acid, 4- or 5-chloroanthranilic acid, 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfo anthranilide, 4-methoxy-2-amino-1-hydroxybenzene, 4-methoxy-5-chloro-2-amino-1-hydroxybenzene, 4-methyl-2-amino-1-hydroxybenzene, 4-methyl-5-nitro-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid, 2-amino-1-hydroxybenzene-4,6-disulfonic acid.

Instead of the above hydroxylated amines, suitable contenders for A are also corresponding methoxy compounds or corresponding compounds whose hydroxyl group has been tosylated, for example anisidine, 4- or 5-chloroanisidine, 4- or 5-nitroanisidine, anisidine-4- or -5-sulfonic acid, or tosylated 1-hydroxy-2-aminobenzene, the methoxy or O-tosyl group of which is converted into an —OH group before or during metallising. Compounds containing these groups are used in particular whenever the corresponding 1-hydroxy-2-amino compounds couple reluctantly.

Further, each of the radicals A, if n is 1 and Z is a —CH group, can also be the radical of an aliphatic or cycloaliphatic amino acid. Examples of suitable amino acids are glycocol, α-alanine, β-alanine, phenylglycine, phenylalanine and 2-aminocyclohexanecarboxylic acid.

In preferred dyes of the formula I, each A is independently the radical of a 1-hydroxy-2-aminobenzene which may be substituted by halogen, nitro, sulfo or low molecular alkyl or alkoxy, or is the radical of a 1-amino-2-hydroxy-4-sulfonaphthalene which may be substituted in the 6-position by chlorine, nitro or sulfo.

The radicals B and D are derived preferably from the following groups of coupling components: phenols which couple in the ortho-position and which are unsubstituted or substituted by low molecular alkyl or alkoxy, dialkylamino or acylamino, where acylamino denotes $C_1$–$C_4$alkanoylamino, $C_1$–$C_4$alkylsulfonylamino, $C_1$–$C_4$alkoxycarbonylamino, aroylamino or arylsulfonylamino radicals; naphthols which are unsubstituted or substituted by $C_1$–$C_4$alkyl or $C_1$–$C_4$alkoxy, chlorine, amino, acylamino or sulfo, where acylamino is as defined above; 5-pyrazolones or 5-aminopyrazoles, preferably those which carry in the 1-position a phenyl or naphthyl radical, each unsubstituted or substituted by chlorine, nitro, $C_1$–$C_4$alkyl or $C_1$–$C_4$alkoxy groups or sulfo groups, and in the 3-position carry a $C_1$–$C_4$alkyl group or a carboxy group, preferably a methyl group; naphthylamines which are unsubstituted or substituted by sulfo, sulfonamido or sulfone groups; acetoacetamides, preferably acetoacetanilides, and benzoylacetanilides which may be substituted in the anilide nucleus by chlorine, bromine, nitro, $C_1$–$C_4$alkyl or $C_1$–$C_4$alkoxy groups or sulfo groups; 6-hydroxy-3-cyano-, 6-hydroxy-3-sulfomethyl- or 6-hydroxy-3-carbamoyl-4-alkyl-2-pyridones which are substituted in the 1-position by unsubstituted or substituted alkyl, for example methyl, ethyl, isopropyl, β-hydroxyethyl, β-aminoethyl or γ-isopropoxypropyl or by phenyl, and in the 4-position can carry a $C_1$–$C_4$alkyl group, preferably methyl; hydroxyquinolines, resorcinol or barbituric acid.

Examples of such coupling components are: 2-naphthol, 1-naphthol, 1-acetylamino-7-naphthol, 1-propionylamino-7-naphthol, 1-carboxymethoxyamino-7-naphthol, 1-carboethoxyamino-7-naphthol, 1-carboxypropoxyamino-7-naphthol, 1-acetylamino-6-naphthol, 2-naphthol-3, -4-, -5-, -6-, -7- or -8-sulfonic acid, 1-naphthol-3-, -4- or -5-sulfonic acid, 1-naphthol-3,6- or -4,8-disulfonic acid, 2-naphthol-6,8-disulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthalene-6-sulfonic acid, 2-aminonaphthalene-5-sulfonic acid, 6-methylsulfonyl-2-aminonaphthalene, 1-phenyl-3-methylpyrazol-5-one, 1-phenyl-3-carbamoyl-5-pyrazolone, 1-(2'-, 3'- or 4'-methylphenyl)-3-methyl-pyrazol-5-one, 1-(2'-, 3'- or 4'-sulfophenyl)-3-methyl-pyrazol-5-one, 1-(2'-chloro-5'-sulfophenyl)-3-methyl-pyrazol-5-one, 1-(2'- or 4'-methoxyphenyl)-3-methyl-pyrazol-5-one, 1-(2'-, 3'- or 4'-chlorophenyl)-3-methyl-pyrazol-5-one, 1-(2'-, 3'- or 4'-nitrophenyl)-3-methyl-pyrazol-5-one, 1-(2',5'- or 3', 4'-dichlorophenyl)-3-methylpyrazol-5-one, 1-(2',5'-dichloro-4'-sulfophenyl)-3-methylpyrazol-5-one, 1-(2'-, 3'- or 4'-sulfophenyl)-3-methyl-5-aminopyrazol, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidide, acetoacet-o-toluidide, acetoacet-o-chloroanilide, acetoacet-m-xylidide, tetralol, 4-methylphenol, 3-dialkylaminophenols, preferably 3-dimethylamino- and 3-diethylaminophenol, 4-butylphenol, preferably 4-tert-butylphenol, 4-amylphenol, in particular 4-tert-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridone, 1-phenyl-3-carbamoyl-4-methyl-6-hydroxypyridone, 1-ethyl-3-cyano-4-methyl-6-hydroxypyridone, 3-sulfomethyl-4-methyl-6-hydroxypyridone, 3-carbamoyl-4-methyl-6-hydroxypyridone, 1-ethyl-4-hydroxy-2-quinolone, 2,4-dihydroxyquinoline, resorcinol, barbituric acid or 3-methylpyrazol-5-one.

Preferably each of the coupling components B and D independently of the other is a 1- or 2-naphthol which is unsubstituted or substituted by amino and/or sulfo, 1-or 2-naphthylamine, unsubstituted or substituted by sulfo, p-$C_1$–$C_6$alkylphenol, resorcinol, barbituric acid, 6-hydroxy-4-alkylpyridone which is substituted in the 3-position by cyano, carbamoyl or sulfomethyl, and in the 1-position is unsubstituted or substituted by $C_1$–$C_4$alkyl, or is 1-phenyl-3-methyl-5-pyrazolone, or acetoacetanilide, the phenyl moiety of which last two compounds can be substituted by $C_1$–$C_4$alkyl, $C_1$–$C_4$alkoxy, chlorine, nitro or sulfo.

If Z is a —CH group, the adjacent substituent B or D is the radical of an o-hydroxyaldehyde, preferably of an o-hydroxybenzaldehyde or o-hydroxynaphthaldehyde which can be substituted by low molecular alkyl, halogen, sulfo, naphthylazo, sulfonaphthylazo or, preferably, by phenylazo or phenylazo which is substituted by sulfo, $C_1$–$C_4$alkyl, $C_1$–$C_4$alkoxy, phenylazo or nitro. Examples of suitable aldehydes are: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2'-, 3'- or 4'-sulfophenylazo)-2-hydroxybenzaldehyde, 5-(6'-sulfonaphthyl-1'-azo)-2-hydroxybenzaldehyde or 5-(4''-sulfo-4'-phenylazo)phenylazo-2-hydroxybenzaldehyde.

The bridge member Y has the formula —$SO_2$— or —$SO_2$—NR—$SO_2$—, wherein R is hydrogen or $C_1$–$C_4$alkyl, for example methyl, ethyl, n-propyl, isopropyl or butyl. The preferred meaning of Y is —$SO_2$— and, most particularly, —$SO_2$—NH—$SO_2$—, in which case a cation, for example sodium, may take the place of the proton in the dyes of this invention. This is normally the case at pH 7. The bridge member is preferably in the para-position relative to the hydroxyl groups.

Preferred dyes of the present invention, in the form of the free acid, are those of the formula

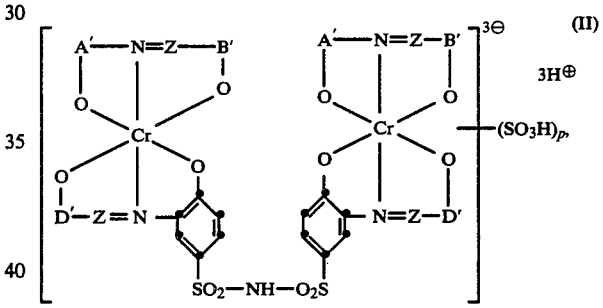

(II)

wherein each of the symbols independently has the following meanings:

Z is nitrogen or a —CH group,

A' is a radical of the benzene or naphthalene series which carries the hydroxyl group ortho to the azo or azomethine group, B' is the radical of a coupling component which couples in the α- or ortho-position to the hydroxyl group, D' has one of the meanings of B' if the adjacent substituent Z is nitrogen or is the radical or an o-hydroxyaldehyde if Z is the —CH group, and p is an integer from 0 to 6.

Among these preferred compounds, particularly preferred compounds are those in which each A' independently is the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by chlorine, nitro or sulfo, each B' independently is a 1- or 2-naphthol which is unsubstituted or substituted by amino and/or sulfo, 1- or 2-naphthylamine which is unsubstituted or substituted by sulfo, p-$C_1$–$C_6$alkylphenol, resorcinol, barbituric acid, 6-hydroxy-4-alkylpyridone which is substituted in the 3-position by cyano, carbamoyl or sulfomethyl, and in the 1-position is unsubstituted or substituted by $C_1$-$C_4$alkyl, or is 1-phenyl-3-methyl-5-pyrazolone or acetoacetanilide, the phenyl moiety of which last two mentioned compounds may be substituted by $C_1$-$C_4$alkyl, $C_1$-$C_4$alkoxy, chlorine, nitro or sulfo, each D' independently has one of the meanings of B' if the adjacent substituent Z is nitrogen, or, if Z is the —CH group, is the radical of an o-hydroxybenzaldehyde or o-hydroxynaphthaldehyde which may be substituted by low molecular alkyl, halogen, sulfo, naphthylazo, sulfonaphthylazo or, preferably, by phenylazo or phenylazo which is substituted by sulfo, $C_1$-$C_4$alkyl, $C_1$-$C_4$alkoxy, phenylazo or nitro, and Z and p are as defined for formula II.

Particularly preferred chromium complexes are those in which the two radicals A'—N═N—B' are identical and the two radicals —D'—Z═ are also identical.

The novel chromium complexes are prepared in a manner known per se, for example by converting 1 mole of a dye of the formula III

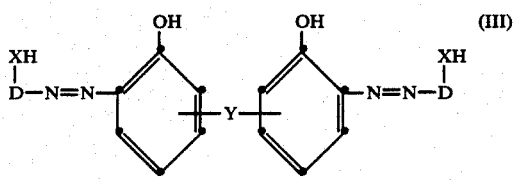

into the bis-1:2 chromium complex with 2 moles of the 1:1 chromium complex of a dye of the formula IV

in which formulae (III) and (IV) above D, X, n, Y, A, Z and B are as defined for formula I.

The formation of the 1:1 chromium complex of the dye of formula IV and the reaction thereof with the dye of formula III to give the bis-1:2 chromium complex are carried out by conventional methods. Instead of using 2 moles of a dye of formula IV, it is also possible to use 1 mole of each of two different compounds of formula IV, in which case chromium complexes of formula I are obtained, wherein both radicals A and/or B are different.

The dyes of the formula IIIa

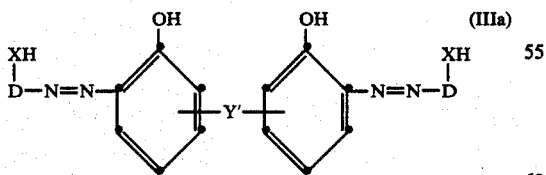

wherein Y' is a radical of the formula —$SO_2$—NR—$SO_2$—, in which R is hydrogen or $C_1$-$C_4$alkyl, and wherein D and X have the meanings assigned to them above, are novel and likewise constitute an object of the present invention. They are prepared, for example, by diazotising both amino groups of compounds of the formula V

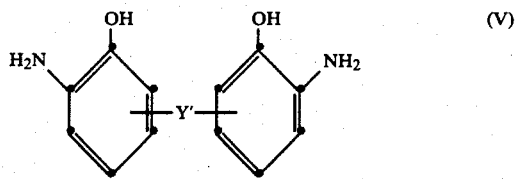

and then coupling the diazo compound to a coupling component of the formula VI $$HX-D-H \qquad (VI)$$

The chromium complexes of the formula I, wherein the radicals Z, which are attached through nitrogen to the phenyl rings bridged by the group Y, are the —CH group, are prepared for example by reacting 2 moles of the 1:1 chromium complex of a dye of the formula IV

with a mixture of 2 moles of an aldehyde of the formula VII

and 1 mole of the compound of the formula VIII

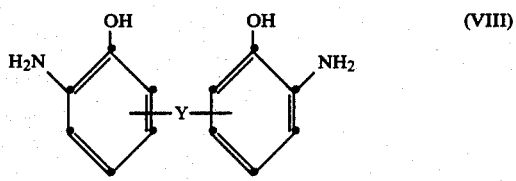

In this case, too, a mixture of two such compounds can be used instead of individual compounds of the formula IV and/or VII. In the formulae above, A, Z, B, X, Y, D and n are as defined for formula I.

The intermediates of the formula V

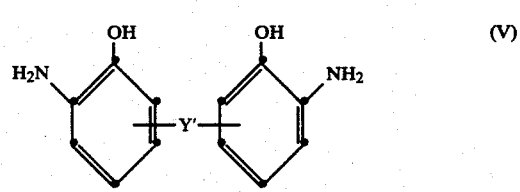

wherein Y' is a bridge member of the formula —$SO_2$—NR—$SO_2$—, in which R is hydrogen or $C_1$-$C_4$alkyl, are novel. They are prepared for example by methods which are known per se by reduction of the novel compounds of the formula IX

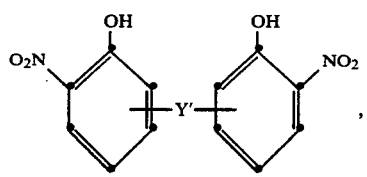

wherein Y' is as defined above.

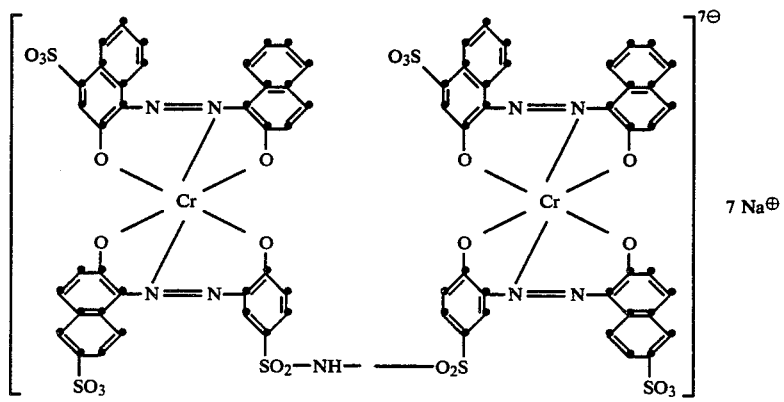

The compounds of the formula IX can be prepared for example by conventional alkaline saponification of compounds of the formula X

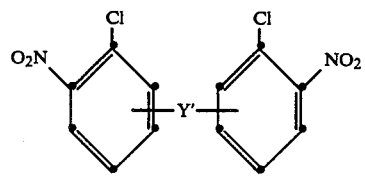

Compounds of the formula X are known, for example, from German Offenlegungsschrift specifications 2 000 927 and 2 610 626.

The novel metal complex dyes obtainable by the above processes are conveniently isolated in the form of their salts, preferably alkali salts such as lithium, potassium and, most preferably, sodium salts, or also ammonium salts. They are suitable for dyeing a very wide range of natural or synthetic nitrogen-containing materials and materials that contain hydroxyl groups, for example polyamides or polyurethanes, and preferably for dyeing wool or, in particular, leather.

The dyes of formula I, wherein Y is the —SO$_2$N-H—SO$_2$— group and p is 0, are particularly suitable for dyeing wool or polyamide. The dyeings obtained are level and have good fastness properties such as lightfastness to light, washing, water, hot water, perspiration, rubbing, fulling, decatising and carbonising.

For dyeing leather it is preferred to use dyes containing 1 to 4, preferably 2, sulfo groups. These dyes are productive and have good covering power. They have good affinity and good stability to acid and alkali, and they give dyeings of good fastness properties such as fastness to diffusion, light, acid and alkali. To be singled out for special mention is the good build-up on different types of leather, both on leather tanned only with chromium salts as well as on leather retanned with vegetable or synthetic tannins. Strong orange red to black shades are obtained.

In the following Examples parts and percentages are by weight, unless otherwise indicated.

EXAMPLE 1

17.95 parts of the trisodium salt of 3,3'-diamino-4,4'-dihydroxydiphenyl-1,1'-disulfimide are tetrazotised by the dropwise addition of an aqueous solution of 6.9 parts of sodium nitrite at 0° to 5° C. over ½ hour to a solution of 25 parts by volume of 10N hydrochloric acid and 50 ml of H$_2$O. The aqueous suspension of the tetrazonium compound is stirred for 2 hours at 0°-5° C. After destroying any excess nitrite with sulfamic acid, the pH is adjusted with sodium carbonate solution to 4–4.5. The tetrazonium compound is added dropwise at 0°-5° C. over 20 minutes to an aqueous solution of 22.4 parts of the disodium salt of 2-naphthol-6-sulfonic acid while keeping the pH at 9–9.5 with 2N sodium hydroxide solution. When coupling is complete, the suspension of the disazo dye is adjusted with 10N hydrochloric acid to pH 7.5, warmed to 40° C., and sodium chloride is added. After stirring for 1 hour, the red dye is isolated by filtration, washed with a dilute solution of sodium chloride and dried at 60°-70° C. in vacuo. 41.5 parts of the above disazo dye are added to 500 parts of H$_2$O. Then the 1:1 chromium complex, which contains 39.4 parts of the dye obtained from diazotised 1-amino-2-hydroxynaphthalene-4-sulfonic acid and 2-naphthol as well as 5.2 parts of chromium, are added. The mixture of both components is heated to 80°-85° C. and the pH is adjusted to 7 with 5N sodium hydroxide solution. The reaction mixture is kept at constant pH and at 80°-85° C. until no more starting materials can be detected. The complex dye is isolated by evaporating the reaction mixture to dryness. The dark powder so obtained dissolves in water to give a dark blue solution and dyes leather in fast reddish blue shades.

EXAMPLE 2

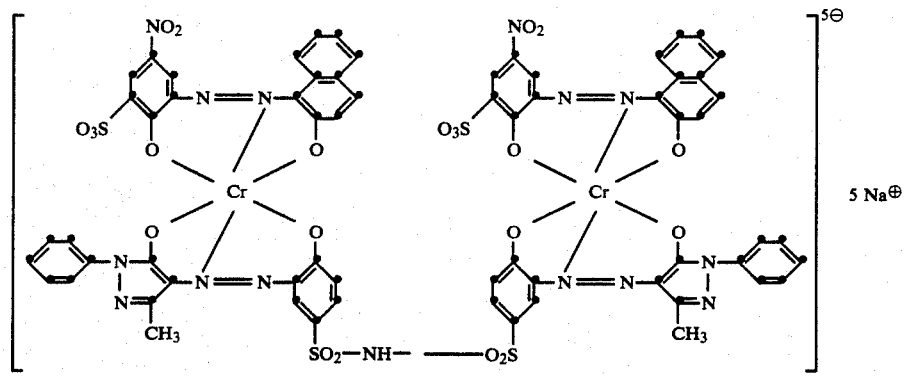

17.95 parts of 3,3′-diamino-4,4′-dihydroxydiphenyl-1,1′-disulfimide are tetrazotised as described in Example 1. The tetrazonium compound is added dropwise at 0°–5° C. over 20 minutes to an aqueous solution of 17.4 parts of the sodium salt of 1-phenyl-3-methylpyrazolone at a constant pH of 9–9.5. When the coupling is complete, the suspension of the disazo dye is adjusted to pH 7.0 with 10N hydrochloric acid, heated to 60° C., stirred for 30 minutes and filtered. The product is washed with a dilute solution of sodium chloride and dried in vacuo at 60°–70° C.

36.5 parts of the above disazo dye are added to 800 parts of $H_2O$. Then the 1:1 chromium complex, which contains 38.9 parts of the dye obtained from diazotised 2-amino-4-nitro-6-sulfophenyl and 2-naphthol, are added. The reaction mixture is heated to 80°–85° C. and the pH is adjusted to 7 with 5N sodium hydroxide solution. The reaction mixture is kept at constant pH and at 80°–85° C. until nor more starting materials can be detected. The complex dye is isolated by evaporating the reaction mixture to dryness. The dark red powder dissolves in water to give a dark brown solution and dyes leather in fast reddish brown shades.

Following the procedures described in Examples 1 and 2, dyes of analogous structure which dye leather in the shades indicated in column 5 with good fastness properties are obtained by reacting the diamines of column 2 of Table I with the coupling components of column 3 to give the corresponding diazo dye, and reacting said dye with 2 moles of the 1:1 chromium complex of column 4, and otherwise maintaining the same conditions.

TABLE 1

| No. | Diamine | Coupling component | 1:1 Chromium complex of | Shade |
|---|---|---|---|---|
| 1 | [structure: H₂N, OH, SO₂—NH—O₂S, NH₂, OH] | [structure: naphthol with HO₃S and OH] | [structure with HO₃S, NO₂, N=N, OH, OH] | dark blue |
| 2 | " | " | [structure with HO₃S, HO₃S, NO₂, OH, OH, N=N, NH₂] | grey |
| 3 | " | " | [structure with SO₃H, N=N, OH, OH, N=N, naphthol] | violet gray |
| 4 | " | " | [structure with HO₃S, OH, OH, NO₂, N=N, naphthol] | bluish black |

TABLE 1-continued
| No. | Diamine | Coupling component | 1:1 Chromium complex of | Shade |
|---|---|---|---|---|
| 5 | " | " | 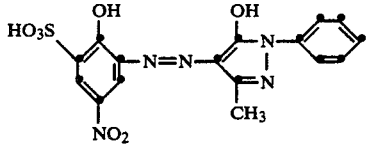 | dark brown |
| 6 | " | " | 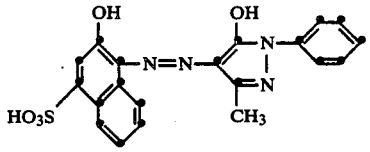 | violet ruby |
| 7 | " | 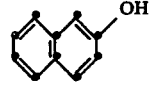 | 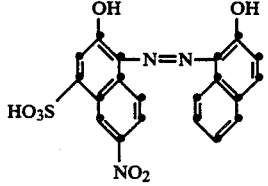 | bluish black |
| 8 | " | " | 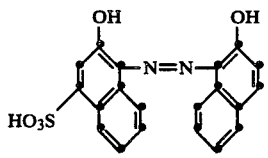 | dark blue |
| 9 | " | " | 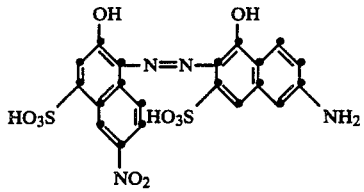 | bluish black |
| 10 | " | " | 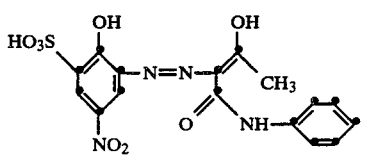 | dark brown |
| 11 | " | 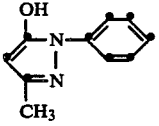 | 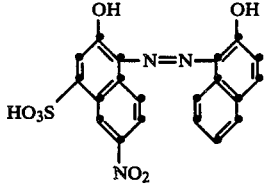 | dark brown |
| 12 | " | " | 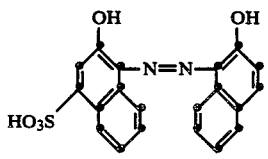 | greyish brown |
| 13 | " | " | 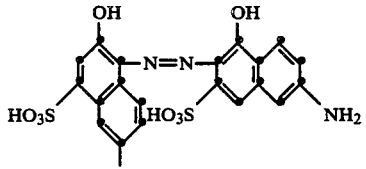 | black |

TABLE 1-continued

| No. | Diamine | Coupling component | 1:1 Chromium complex of | Shade |
|---|---|---|---|---|
| 14 | " | " | (structure: SO₃H-phenyl-N=N-phenyl(OH)-N=N-naphthol with OH) | dark brown |
| 15 | " | " | (structure: HO₃S, OH, NO₂ substituted phenyl-N=N-naphthol) | dark brown |
| 16 | " | " | (structure: HO₃S, OH, NO₂ phenyl-N=N-pyrazolone with phenyl and CH₃) | orange |
| 17 | " | " | (structure: HO₃S, OH, NO₂ phenyl-N=N-C(CH₃)=C(OH)-C(O)NH-phenyl) | orange |
| 18 | " | " | (structure: OH, HO₃S naphthyl-N=N-pyrazolone with CH₃ and phenyl) | red |
| 19 | " | (OH, CH₃ pyrazole-N-phenyl-SO₃H) | (structure: OH, HO₃S naphthyl-N=N-naphthyl with OH, NO₂) | dark brown |
| 20 | " | " | (structure: OH, HO₃S naphthyl-N=N-naphthyl with OH) | dark brown |
| 21 | " | " | (structure: OH, HO₃S, NO₂ naphthyl-N=N-naphthyl with OH, HO₃S, NH₂) | brownish grey |

TABLE 1-continued

| No. | Diamine | Coupling component | 1:1 Chromium complex of | Shade |
|---|---|---|---|---|
| 22 | " | [structure: OH, CH3, O, NH-phenyl acetoacetanilide] | [structure: OH-naphthalene-N=N-naphthalene-OH with HO3S and NO2] | dark olive |
| 23 | " | " | [structure: OH-naphthalene-N=N-naphthalene-OH with HO3S] | greenish olive |
| 24 | " | " | [structure: OH-naphthalene-N=N-naphthalene-OH with HO3S, HO3S, NO2, NH2] | green |
| 25 | " | " | [structure: SO3H-phenyl-N=N-phenyl-OH-N=N-naphthalene-OH] | brownish olive |
| 26 | " | " | [structure: HO3S, OH-phenyl-N=N-naphthalene-OH with NO2] | olive brown |
| 27 | " | " | [structure: HO3S, OH-phenyl-N=N-pyrazolone with NO2, CH3, N-phenyl] | orange |
| 28 | " | " | [structure: HO3S, OH-phenyl-N=N-C(CH3)=C(OH)-C(O)NH-phenyl with NO2] | yellow |
| 29 | " | " | [structure: OH-naphthalene-N=N-pyrazolone with HO3S, CH3, N-phenyl] | red |
| 30 | " | [structure: OH, CH3, O, NH-phenyl-Cl acetoacetanilide] | " | red |

TABLE 1-continued

| No. | Diamine | Coupling component | 1:1 Chromium complex of | Shade |
|-----|---------|--------------------|-----|-------|
| 31 | " | " | [structure: HO₃S, OH, NO₂ phenyl ring azo-linked to pyrazolone with OH, N-phenyl, CH₃] | orange |
| 32 | " | " | [structure: HO₃S, OH, NO₂ phenyl azo-linked to OH-naphthyl] | olive dark brown |
| 33 | " | " | [structure: HO₃S, OH, NO₂ phenyl azo-linked to OH, CH₃, C(O)NH-phenyl] | brownish yellow |
| 34 | " | resorcinol (1,3-dihydroxybenzene) | [structure: OH, HO₃S naphthyl azo-linked to OH-naphthyl] | violet |
| 35 | " | " | [structure: OH, HO₃S, NO₂ naphthyl azo-linked to OH-naphthyl] | violet |
| 36 | " | " | [structure: OH, HO₃S, HO₃S, NO₂ naphthyl azo-linked to OH, NH₂-naphthyl] | bluish black |
| 37 | " | " | [structure: OH, O₂N phenyl azo-linked to NH₂, SO₃H-naphthyl] | dark brown |
| 38 | " | 1-ethyl-3-cyano-4-methyl-6-hydroxy-2-pyridone | [structure: OH, HO₃S, NO₂ naphthyl azo-linked to OH-naphthyl] | violet brown |

TABLE 1-continued

| No. | Diamine | Coupling component | 1:1 Chromium complex of | Shade |
|---|---|---|---|---|
| 39 | " | " | [structure: bis-naphthol azo with HO₃S, HO₃S, NO₂, NH₂ substituents] | greyish black |
| 40 | " | [structure: CH₃, CH₂SO₃H pyridinone with HO, NH, O] | [structure: bis-naphthol azo with HO₃S, NO₂] | violet black |
| 41 | " | " | [structure: bis-naphthol azo with HO₃S] | violet |
| 42 | " | [structure: CH₃, CONH₂ pyridinone with HO, NH, O] | [structure: bis-naphthol azo with HO₃S, NO₂] | violet brown |
| 43 | " | " | [structure: bis-naphthol azo with HO₃S, HO₃S, NO₂, NH₂] | violet black |
| 44 | " | [structure: pyrimidine with OH, N, HO, N, OH] | [structure: bis-naphthol azo with HO₃S, NO₂] | dark brown |
| 45 | " | " | [structure: bis-naphthol azo with HO₃S] | dark brown |
| 46 | " | " | [structure: naphthol-azo-aminonaphthol with OH, NH₂, O₂N, SO₃H] | olive brown |

TABLE 1-continued

| No. | Diamine | Coupling component | 1:1 Chromium complex of | Shade |
|---|---|---|---|---|
| 47 | " | " | 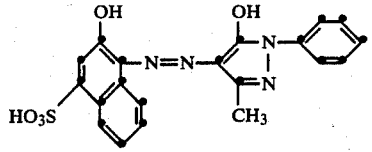 | red |

EXAMPLE 3

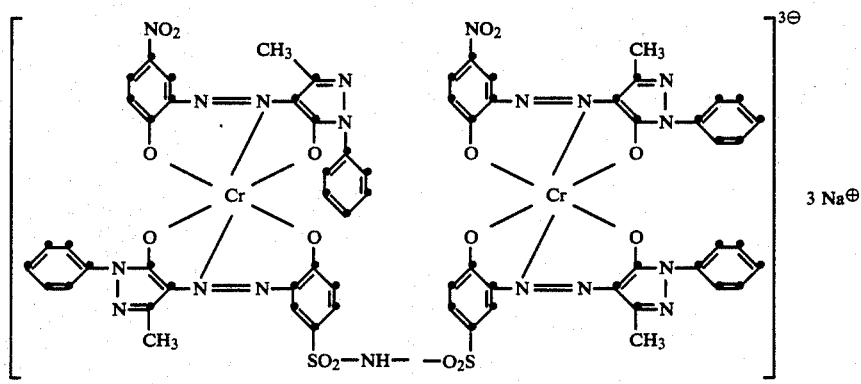

36.5 parts of the disazo dye described in Example 2 and obtained from tetrazotised 3,3'-diamino-4,4'-dihydroxydiphenyl-1,1'-disulfimide and 1-phenyl-3-methylpyrazolone are added to 250 parts of ethylene glycol. Then the 1:1 chromium complex, which contains 33.9 parts of the dye obtained from diazotised 2-amino-4-nitrophenol and 1-phenyl-3-methylpyrazolone as well as 5.2 parts of chromium, are added. The reaction mixture is heated to 80°–85° C. and adjusted to pH 7 with 5N sodium hydroxide solution. The reaction solution is kept at constant pH and at 80°–85° C. until no more starting materials can be detected, then poured into a concentrated solution of sodium chloride. The precipitate is isolated by filtration, washed with a dilute solution of sodium chloride, then dried in vacuo at 60°–70° C. The resultant dark powder dissolves in water to give an orange solution and dyes wool, polyamide and leather in fast orange shades.

Following the procedure described in Example 3, dyes of analogous structure which have the shades indicated in column 5 and which dye leather, wool and polyamide with good fastness properties are obtained by reacting the diamines of column 2 of Table II with the coupling components of column 3 to give the corresponding disazo dye, and reacting said dye with 2 moles of the 1:1 chromium complex of column 4, and otherwise maintaining the same conditions.

TABLE II

| No. | Diamine | Coupling component | 1:1 Chromium complex of | Shade |
|---|---|---|---|---|
| 1 | 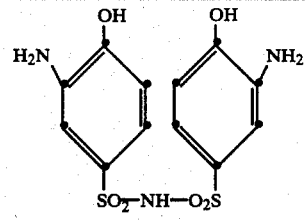 | 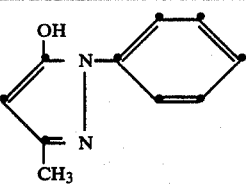 | 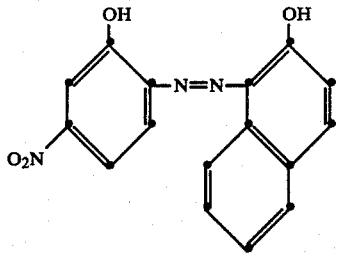 | bluish brown |
| 2 | " | " | 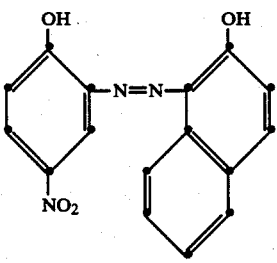 | claret |

TABLE II-continued

| No. | Diamine | Coupling component | 1:1 Chromium complex of | Shade |
|---|---|---|---|---|
| 3 | " | ![2-naphthol] | ![complex with nitro] | grey |
| 4 | " | " | ![complex with NO2] | brownish violet |
| 5 | " | " | ![complex with pyrazolone] | brown |

EXAMPLE 4

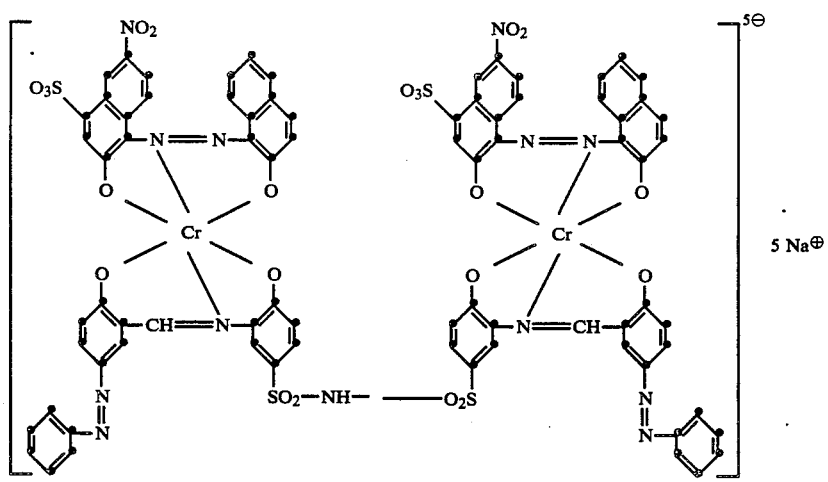

The 1:1 chromium complex which contains 43.9 parts of the dye obtained from diazotised 6-nitro-1-amino-2-hydroxynaphthalene-4-sulfonic acid and 2-hydroxynaphthalene as well as 5.2 parts of chromium, is added to 700 parts of water. Then 17.85 parts of 3,3'-diamino-4,4'-dihydroxydiphenyl-1,1'-disulfimide and 22.6 parts of the monoazo dye obtained from diazotised aminobenzene and salicylaldehyde are added. The reaction mixture is then heated to 80°–85° C., adjusted to pH 7 with sodium hydroxie solution, and kept at this temperature and at constant pH until no more starting materials can be detected. When the reaction is complete, the dye is isolated by concentrating the reaction mixture. The resultant dark powder dissolves in water to give an olive brown solution and dyes leather in fast black olive shades.

EXAMPLE 5

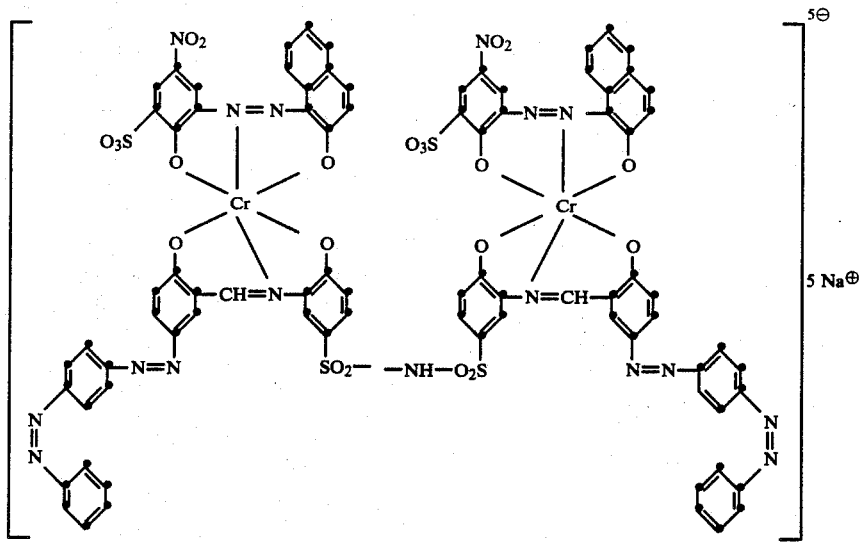

43.9 parts of the 1:1 complex chromium compound of the type consisting of 1 atom of chromium per molecule of dye and which contains 5.2 parts of chromium and 38.9 parts of the monoazo dye obtained from diazotised 4-nitro-2-amino-1-hydroxybenzene-6-sulfonic acid and 2-hydroxynaphthalene, together with 17.85 parts of 3,3'-diamino-4,4'-dihydroxydiphenyl-1,1'-disulfimide and 33 parts of the disazo dye obtained from diazotised 4-aminoazobenzene and salicylaldehyde are suspended in 600 parts of ethylene glycol. The reaction mixture is heated to 80°-85° C., adjusted to pH 7-7.5 with 5N sodium hydroxide, and kept at this temperature and at constant pH until the addition reaction is complete. Upon completion of the reaction, the chromium-containing dye is salted out with a saturated solution of sodium chloride, isolated by filtration and dried. The dark powder so obtained dissolves in water to give a yellowish brown solution and dyes leather in fast brown shades.

Following the procedures described in Examples 4 and 5, dyes of analogous structure which have the shades indicated in column 5 and which dye leather with good fastness properties are obtained by reacting the diamines of column 2 of Table III with the coupling components of column 3 to give the corresponding bisazomethine dye and reacting said dye with 2 moles of the 1:1 chromium complex of column 4, and otherwise maintaining the same conditions.

TABLE III

| No. | Diamine | Aldehyde | 1:1 Chromium complex of | Shade |
|---|---|---|---|---|
| 1 | (OH, NH₂ / OH, NH₂ / SO₂—NH—O₂S) | (OH, CHO / N=N—⌬) | (O₂N, OH / N=N—C, CH₃ / C—N, C=N, CH₃ / SO₃H) | brownish red |
| 2 | " | " | (OH / N=N / OH naphthyl / N=N—⌬—SO₃H) | olive brown |
| 3 | " | " | (HO₃S, OH / N=N—C, NO₂ / C—N, C=N, CH₃ / OH ⌬) | orange |

TABLE III-continued

| No. | Diamine | Aldehyde | 1:1 Chromium complex of | Shade |
|---|---|---|---|---|
| 4 | " | " | 2-hydroxy-5-nitrophenylazo-pyrazolone with OH, CH₃, SO₃H-phenyl substituents | orange |
| 5 | " | " | 3-sulfo-2-hydroxy-5-nitrophenylazo acetoacetanilide | brownish yellow |
| 6 | " | " | bis(hydroxy-sulfo) naphthylazo with NO₂ and NH₂ | olive |
| 7 | " | " | 3-sulfo-2-hydroxy-5-nitrophenylazo-2-naphthol | olive brown |
| 8 | " | " | 3-sulfo-hydroxy-naphthylazo-hydroxynaphthyl | olive |
| 9 | " | " | 3-sulfo-2-hydroxy-5-nitrophenylazo-2-hydroxy-5-tert-amylphenyl | brown |
| 10 | " | " | 3-sulfo-2-hydroxy-5-nitrophenylazo-2-hydroxy-5-tert-butylphenyl | brown |
| 11 | 2-hydroxy-3-amino + 4-sulfonyl-2-hydroxy-3-amino diphenylsulfone | " | 3-sulfo-hydroxy-nitronaphthylazo-2-naphthol | dark olive |

TABLE III-continued

| No. | Diamine | Aldehyde | 1:1 Chromium complex of | Shade |
|---|---|---|---|---|
| 12 | " | " | [structure: bis-naphthol azo with HO₃S] | olive |
| 13 | [structure: OH, NH₂ substituted bis-phenyl linked by SO₂—NH—O₂S] | [structure: OH, CHO phenyl-N=N-phenyl-N=N-phenyl] | [structure: bis-naphthol azo with HO₃S and NO₂] | brown |
| 14 | " | " | [structure: O₂N, OH, CH₃ phenyl-N=N-pyrazolone with SO₃H phenyl] | brownish red |
| 15 | " | [structure: OH, CHO phenyl-N=N-phenyl-N=N-phenyl] | [structure: HO₃S, OH, NO₂ phenyl-N=N-pyrazolone with phenyl] | orange |
| 16 | " | " | [structure: OH, NO₂ phenyl-N=N-pyrazolone with SO₃H phenyl] | orange |
| 17 | " | " | [structure: bis-naphthol azo with HO₃S, HO₃S, NO₂, NH₂] | olive brown |
| 18 | " | " | [structure: bis-naphthol azo with HO₃S] | dark brown |

| No. | Diamine | Aldehyde | 1:1 Chromium complex of | Shade |
|---|---|---|---|---|
| 19 | " | " | HO$_3$S, OH, N=N, OH, NO$_2$, C$_4$H$_9$t | yellowish brown |
| 20 | " | " | HO$_3$S, OH, N=N, OH, NO$_2$, C$_5$H$_{11}$t | yellowish brown |
| 21 | OH, NH$_2$, SO$_2$, NH$_2$, OH | " | OH, N=N, OH, HO$_3$S, NO$_2$ | brown |
| 22 | OH, NH$_2$, NH$_2$, OH, SO$_2$ | OH, CHO | OH, N=N, OH, N=N, SO$_3$H | olive black |
| 23 | " | " | OH, N=N, OH, HO$_3$S, NO$_2$ | olive brown |
| 24 | " | " | OH, N=N, OH, HO$_3$S | brown olive |
| 25 | " | " | HO$_3$S, OH, N=N, OH, NO$_2$ | brownish olive |
| 26 | " | " | HO$_3$S, OH, N=CH, OH, NO$_2$ | orange |
| 27 | OH, NH$_2$, OH, NH$_2$, SO$_2$—NH—O$_2$S | " | " | orange |

TABLE III-continued

| No. | Diamine | Aldehyde | 1:1 Chromium complex of | Shade |
|---|---|---|---|---|
| 28 | " | " | [structure: OH, OH naphthyl-N=N-naphthyl; HO₃S, NO₂ substituents] | black |
| 29 | " | " | [structure: OH, OH naphthyl-N=N-naphthyl; HO₃S substituent] | greenish olive |
| 30 | " | " | [structure: HO₃S, OH phenyl-N=N-naphthyl-OH; NO₂ substituent] | brownish olive |
| 31 | " | " | [structure: O₂N, OH phenyl-N=N-naphthyl-OH; SO₃H substituent] | olive brown |
| 32 | " | " | [structure: OH phenyl-N=N-naphthyl-OH; SO₃H substituent] | olive brown |
| 33 | " | " | [structure: OH, OH naphthyl-N=N-naphthyl; HO₃S, HO₃S, NH₂, NO₂ substituents] | olive green |
| 34 | " | " | [structure: OH, NH₂ phenyl-N=N-naphthyl; O₂N, SO₃H substituents] | green |
| 35 | " | " | [structure: OH, OH naphthyl-N=N-naphthyl; HO₃S, NO₂ substituents] | olive brown |

TABLE III-continued

| No. | Diamine | Aldehyde | 1:1 Chromium complex of | Shade |
|---|---|---|---|---|
| 36 | " | " | (structure with O₂N, OH, N=N, CH₃, SO₃H) | red |
| 37 | " | " | (structure with OH, N=N, SO₃H, naphthalene) | olive black |
| 38 | " | " | (structure with HO₃S, OH, NO₂, SO₃H, CH₃) | orange |
| 39 | " | " | (structure with OH, NO₂, N=N, SO₃H, CH₃) | orange |
| 40 | " | " | (structure with HO₃S, OH, NO₂, C₅H₁₁t) | olive brown |
| 41 | " | " | (structure with HO₃S, OH, NO₂, C₄H₉t) | olive brown |

EXAMPLE 6

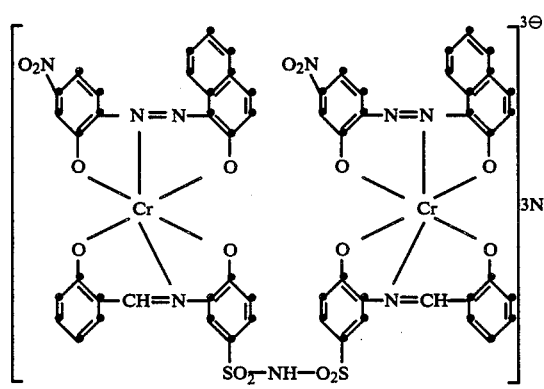

30.9 parts of the monoazo dye obtained from diazotised 5-nitro-2-amino-1-hydroxybenzene and 2-hydroxynaphthalene, together with 26.7 parts of chromium chloride hexahydrate, are stirred in 400 parts by volume of ethylene glycol at 120°–125° C. until no more unchromed dye can be detected. To the resultant solution of the 1:1 chromium complex are then added, at 80°–85° C., 17.85 parts of 3,3'-diamino-4,4'-dihydroxydiphenyl-1,1'-disulfimide and 12.9 parts of salicylaldehyde and the reaction mixture is kept at 80°–85° C. until the addition reaction is complete. Simultaneously the pH of the reaction mixture is adjusted to and kept at 7–7.5 by the addition of 5N sodium hydroxide solution. When the reaction is complete, the adduct is salted out with a saturated solution of sodium chloride, isolated by filtration and dried. The dark powder so obtained dissolves in water to give an olive green solution and dyes wool, polyamide material and leather in olive shades of good fastness properties.

Following the procedure described in this Example, dyes of analogous structure which have the shades indicated in column 5 and which dye wool or polyamide with good fastness properties are obtained by reacting the diamines of column 3 of Table IV with the aldehydes of column 3 to give the corresponding bisazomethine dye, and reacting said dye with 2 moles of the 1:1 chromium complex of column 4, and otherwise maintaining the same conditions.

TABLE IV

| No. | Diamine | Aldehyde | 1:1 Chromium complex of | Shade |
|---|---|---|---|---|
| 1 | bis(2-hydroxy-3-amino-phenyl)sulfonamide | salicylaldehyde | 2-hydroxy-5-nitrophenylazo-2-hydroxynaphthalene | brown |
| 2 | bis(2-hydroxy-3-amino-phenyl)sulfonamide | salicylaldehyde | 2-hydroxy-4-nitrophenylazo-1-amino-2-hydroxynaphthalene | olive green |
| 3 | bis(2-hydroxy-3-amino-phenyl)sulfonamide | salicylaldehyde | 2-hydroxy-5-chlorophenylazo-2-hydroxynaphthalene | violet brown |
| 4 | bis(2-hydroxy-3-amino-phenyl)sulfonamide | salicylaldehyde | 2-methoxy-5-methoxyphenylazo-2-hydroxynaphthalene | violet brown |
| 5 | bis(2-hydroxy-3-amino-phenyl)sulfonamide | salicylaldehyde | 2-methoxy-5-nitrophenylazo-2-hydroxy-5-tert-butylbenzene | brown |
| 6 | bis(2-hydroxy-3-amino-phenyl)sulfonamide | salicylaldehyde | 2-hydroxy-5-nitrophenylazo-2-hydroxy-5-tert-pentylbenzene | brown |

TABLE IV-continued

| No. | Diamine | Aldehyde | 1:1 Chromium complex of | Shade |
|---|---|---|---|---|
| 7 | bis(2-hydroxy-3-amino-phenyl)sulfone (sulfonamide-linked) | salicylaldehyde | azo complex with nitro and dimethyl substituents | brown |
| 8 | bis(2-hydroxy-3-amino-phenyl)sulfonamide | 5-chlorosalicylaldehyde | nitro-phenyl-azo-naphthol | olive |
| 9 | bis(2-hydroxy-3-amino-phenyl)sulfonamide | 5-methylsalicylaldehyde | nitro-phenyl-azo-naphthol | olive |
| 10 | bis(2-hydroxy-3-amino-phenyl)sulfonamide | salicylaldehyde | acetoacetanilide-azo (nitro-hydroxyphenyl) | yellow |
| 11 | bis(2-hydroxy-3-amino-phenyl)sulfonamide | salicylaldehyde | acetoacet-(2-chloroanilide)-azo (nitro-hydroxyphenyl) | yellow |
| 12 | bis(2-hydroxy-3-amino-phenyl)sulfonamide | salicylaldehyde | pyrazolone azo complex | yellowish red |

TABLE IV-continued

| No. | Diamine | Aldehyde | 1:1 Chromium complex of | Shade |
|---|---|---|---|---|
| 13 | HO-C6H3(NH2)-SO2-NH-SO2-C6H3(NH2)-OH | 2-hydroxybenzaldehyde | chromium complex structure with NO2, OH, CH3, Cl substituents | orange |
| 14 | HO-C6H3(NH2)-SO2-NH-SO2-C6H3(NH2)-OH | 2-hydroxybenzaldehyde | chromium complex structure with NO2, OH, CH3 substituents | orange |

EXAMPLE 7

Synthesis of 3,3'-diamino-4,4'-dihydroxydiphenyl-1,1'-disulfimide by saponification and reduction of 3,3'-dinitro-4,4'-dichlorodiphenyl-1,1'-disulfimide.

(1) 3,3'-Dinitro-4,4'-dihydroxydiphenyl-1,1'-disulfimide 45.6 g (0.1 mole) of 3,3'-dinitro-4,4'-dichlorodiphenyl-1,1'-disulfimide (prepared in known manner) are added to 200 ml of water and 50 ml of 10N sodium hydroxide solution are added. The temperature is raised to 95°–98° C. and, after 15 to 20 minutes, complete solution takes place. After a further 5 to 10 minutes, the yellow sodium salt of 3,3'-dinitro-4,4'-dihydroxydiphenyl-1,1'-disulfimide begins to precipitate. After stirring for 3 hours at 95°–98° C., the temperature is allowed to fall to 20°–25° C. and the batch is stirred for a further 8 to 10 hours. The yellow product is isolated by filtration.

Elemental analysis of an acidified sample recrystallised from water: calculated: C 34.37% H 2.16% N 10.02% S 15.29% found: C 34.33% H 2.30% N 9.83% S 15.21%.

(2) 4,4'-Dihydroxy-3,3'-diaminodiphenyl-1,1'-disulfimide

The yellow product obtained by the above procedure is added, in portions, as a moist paste to 100 ml of a 30% solution of sodium hydrosulfide and 80 ml of water at 75°–80° C. and the mixture is reacted for 2 hours at 95°–98° C. When the reduction is complete, the brown solution is made acid to Congo red with 10N hydrochloric acid at 60°–70° C. To remove sulfur, the precipitated product is dissolved in 10N sodium hydroxide solution and the solution is filtered over kieselguhr. The filtrate is made acid to Congo red, whereupon the product precipitates again. After stirring for 1 hour at 20°–25° C., the product is filtered and dried.

Yield: 77% of theory, based on 3,3'-dinitro-4,4'-dichlorodiphenyldisulfimide.

Elemental analysis of a sample recrystallised from water: calculated: C 36.45% H 4.33% N 10.62% S 16.21% found: C 36.59% H 4.32% N 10.64% S 16.60%.

Dyeing Procedure for Leather 100 parts of neutralised, chrome-tanned leather are dyed at 50° C. with 1.0 part of the dye of Example 1 in 500 parts of water. After 30 minutes, 3 parts of a synthetic fatliquoring agent (mixture of alkylbenzenes, aliphatic hydrocarbons, alkanesulfonic acids and surfactants) are added to the dyebath, followed by the addition, after a further 30 minutes, of 0.5 part of 85% formic acid, diluted with 5 parts of water. After 20 minutes the leather is rinsed with water and the dyeing is fixed in conventional manner. A reddish blue dyeing of good fastness properties is obtained.

Dyeing Procedure for Polyamide 100 parts of polyamide knitting yarn are put at 50° C. into a dyebath which contains 2 parts of the dye of Example 6, 4 parts of ammonium sulfate and 2 parts of a levelling agent in 4000 parts of water. The bath is brought to the boil over 45 minutes and kept at boiling temperature for a further 45 minutes. The goods are then removed from the bath, thoroughly rinsed with cold water and dried. An olive green dyeing of good fastness properties is obtained on the polyamide.

Dyeing Procedure for Wool 100 parts of wollen knitting yarn are put at 50° C. into a dyebath which contains 2 parts of the dye of Example 6, 4 parts of ammonium sulfate and 2 parts of a levelling agent in 4000 parts of water. The bath is brought to the boil over 45 minutes and kept at boiling temperature for a further 45 minutes. The goods are then removed from the bath, thoroughly rinsed with cold water and dried. An olive green dyeing of good fastness properties is obtained on the wool.

What is claimed is:

1. A chromium complex dye which, in the form of the free acid, has the formula

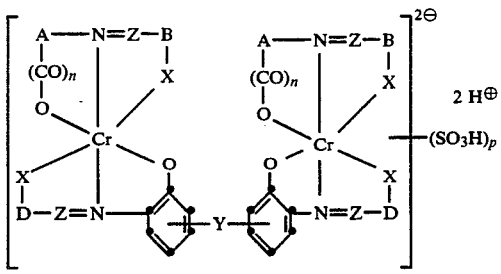

wherein each of the symbols independently has the following meanings:

Z is nitrogen or a —CH,

A is a benzene or naphthalene radical which carries the hydroxyl or carboxy ortho to the azo or azomethine group, or, if n is 1 and Z is a —CH, is the radical of an aliphatic, cycloaliphatic or aromatic aminocarboxylic acid, B and D are each independently of the other the radical of a coupling component which couples in the alpha- or o-position relative to X if Z is nitrogen, or the radical of an o-hydroxyaldehyde if Z is —CH, X is oxygen or —NR, wherein R is hydrogen or $C_1$–$C_4$alkyl, with the proviso that X must be oxygen if Z is —CH, Y is a bridge member of the formula —$SO_2$ or —$SO_2$-NR-$SO_2$—, wherein R is hydrogen or $C_1$–$C_4$alkyl, n is 0 or 1, and p is an integer from 0 to 6.

2. A chromium complex dye according to claim 1, wherein each A independently is the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by chlorine, nitro or sulfo.

3. A chromium complex dye according to claim 1, wherein each of the coupling components B and D independently of the other is a 1- or 2-naphthol which is unsubstituted or substituted by amino or sulfo, 1- or 2-naphthylamine unsubstituted or substituted by sulfo, p-$C_1$–$C_6$alkylphenol, resorcinol, barbituric acid, 6-hydroxy-4-alkylpyridone which is substituted in the 3-position by cyano, carbamoyl or sulfomethyl, and in the 1-position is unsubstituted or substituted by $C_1$–$C_4$alkyl, or is 1-phenyl-3-methyl-5-pyrazolone or acetoacetanilide, the phenyl moiety of which last two compounds is unsubstituted or substituted by $C_1$–$C_4$alkyl, $C_1$–$C_4$alkoxy, chlorine, nitro or sulfo.

4. A chromium complex dye according to claim 1, wherein each of B and D independently of the other is the radical of an o-hydroxybenzaldehyde or o-hydroxynaphthaldehyde which is unsubstituted or substituted by low molecular alkyl, halogen, sulfo, naphthylazo, sulfonaphthylazo or by phenylazo or phenylazo which is substituted by sulfo, $C_1$–$C_4$alkyl, $C_1$–$C_4$alkoxy, phenylazo or nitro, if the adjacent substituent Z is —CH.

5. A chromium complex dye according to claim 1, wherein Y is the —$SO_2$-NH-$SO_2$— group.

6. A chromium complex dye according to claim 1, which contains 0 to 2 sulfo groups.

7. A chromium complex dye according to claim 1, wherein n is 0.

8. A chromium complex dye which, in the form of the free acid, has the formula

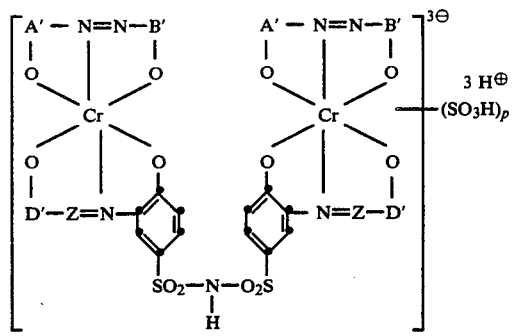

wherein each of the symbols independently has the following meanings:

Z is nitrogen or a —CH,

A is a benzene or naphthalene radical which carries the hydroxyl or carboxy ortho to the azo or azomethine group, or, if n is 1 and Z is a —CH, is the radical of an aliphatic, cycloaliphatic or aromatic aminocarboxylic acid, B and D are each independently of the other the radical of a coupling component which couples in the alpha- or o-position relative to X if Z is nitrogen, or the radical of an o-hydroxyaldehyde if Z is —CH, X is oxygen or —NR, wherein R is hydrogen or $C_1$–$C_4$alkyl, with the proviso that X must be oxygen if Z is —CH, Y is a bridge member of the formula —$SO_2$ or —$SO_2$-NR-$SO_2$—, wherein R is hydrogen or $C_1$–$C_4$alkyl, n is 0 or 1, and p is an integer from 0 to 6.

9. A chromium complex dye according to claim 8, wherein each A' independently is the radical of a 1-hydroxy-2-aminobenzene which is unsubstituted or substituted by halogen, nitro, sulfo or low molecular alkyl or alkoxy, or is the radical of a 1-amino-2-hydroxy-4-sulfonaphthalene which is unsubstituted or substituted in the 6-position by chlorine, nitro or sulfo, each B' independently is a 1- or 2-naphthol which is unsubstituted or substituted by amino or sulfo, 1- or 2-naphthylamine which is unsubstituted or substituted by sulfo, p-$C_1$–$C_6$alkylphenol, resorcinol, barbituric acid, 6-hydroxy-4-alkylpyridone which is substituted in the 3-position by cyano, carbamoyl or sulfomethyl, and in the 1-position is unsubstituted or substituted by $C_1$–$C_4$alkyl, or is 1-phenyl-3-methyl-5-pyrazolone or acetoacetanilide, the phenyl moiety in which last two mentioned compounds may be substituted by $C_1$–$C_4$alkyl, $C_1$–$C_4$alkoxy, chlorine, nitro or sulfo, each D' independently has one of the meanings of B' if the adjacent substituent Z is nitrogen, or, if Z is —CH, is the radical of an o-hydroxybenzaldehyde or o-hydroxynaphthaldehyde which may be substituted by low molecular alkyl, halogen, sulfo, naphthylazo, sulfonaphthylazo or by phenylazo or phenylazo which is substituted by sulfo, $C_1$–$C_4$alkyl, $C_1$–$C_4$alkoxy, phenylazo or nitro, and Z and p are as defined for claim 8.

10. A chromium complex dye according to claim 8, wherein the two radicals A'—N=N-B' are identical and the two radicals —D'Z= are also identical.

11. A dye of the formula

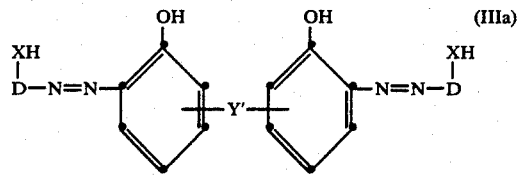

wherein Y' is a radical of the formula —SO$_2$-NR-SO$_2$—, in which R is hydrogen or C$_1$-C$_4$alkyl, each D independently of the other is the radical of a coupling component which couples in the α- or o-position relative to X, and each X independently of the other is oxygen or —NR, in which R is hydrogen or C$_1$-C$_4$alkyl.

* * * * *